(No Model.)

J. NIXON.
TRACTION ENGINE.

No. 263,566. Patented Aug. 29, 1882.

Witnesses:

Inventor:
Jacob Nixon
By F. O. McCleary
His Attorney

UNITED STATES PATENT OFFICE.

JACOB NIXON, OF WINFIELD, KANSAS.

TRACTION-ENGINE.

SPECIFICATION forming part of Letters Patent No. 263,566, dated August 29, 1882.

Application filed March 15, 1882. (No model.)

*To all whom it may concern:*

Be it known that I, JACOB NIXON, of Winfield, in the county of Cowley and State of Kansas, have invented certain new and useful Improvements in Traction-Engines; and I do hereby declare the following to be a full, clear, and exact description of the invention, such as will enable others skilled in the art to which it pertains to make and use the same.

My invention relates to traction-engines designed primarily for use with plows, and likewise for road transportation.

The object of the invention is to provide a traction-engine of such construction that the greatest possible contact with the earth may be obtained, and thus the maximum traction-power secured.

A further object of the invention is to avoid the loss of power incident to the suction or adherence of the engine-track to the ground as it leaves the ground in revolving.

The invention consists in the parts and combinations of parts hereinafter fully set forth, and pointed out in the claims.

Figure 1:
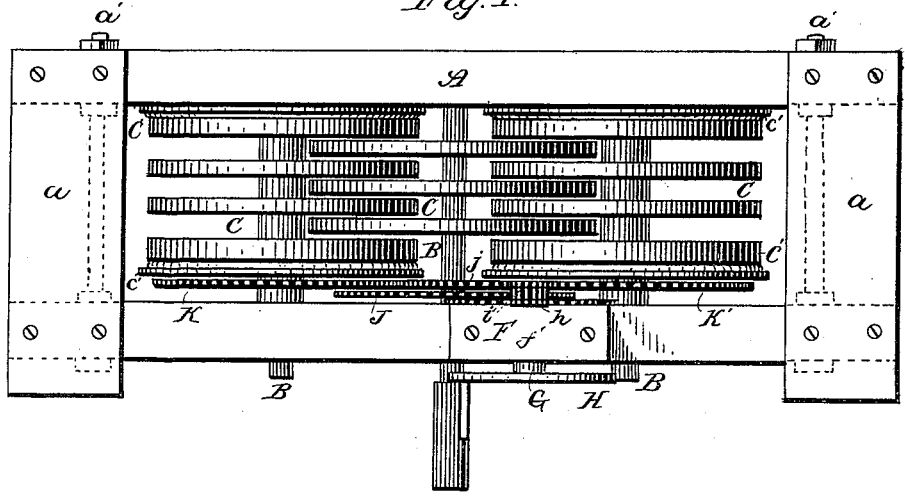
Figure 2:
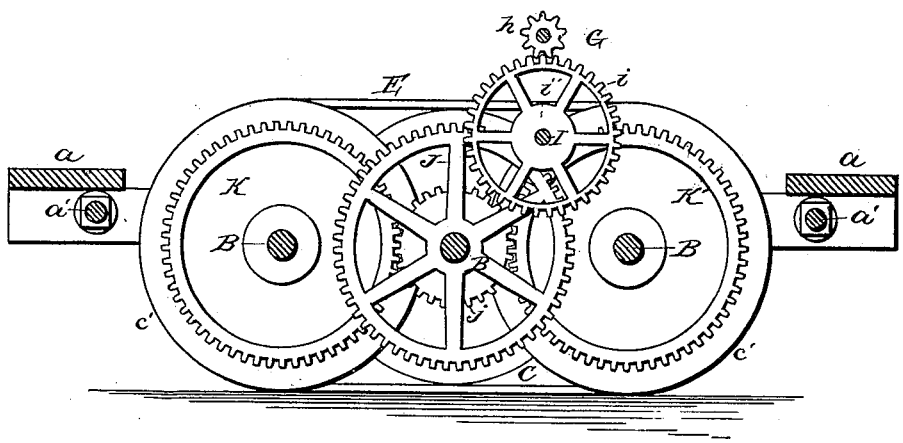
Figure 3:
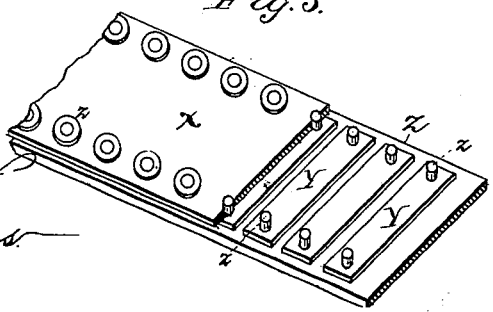

In the drawings, Figure 1 is a plan view of one truck of a traction-engine constructed in accordance with my invention, the endless track being removed. Fig. 2 is a longitudinal section on the line $x\,x$ of Fig. 1, and Fig. 3 is a perspective view illustrating the peculiar construction of the endless track.

It will be apparent that in an operative machine two trucks with their tracks and driving mechanism and suitably connected with each other will be required, the steam-boiler being carried between them; but in the following description only a single truck is referred to, as both trucks will be of the same construction.

A represents the truck or frame of the device, connected at its ends by braces $a\,a$ and bolts $a'\,a'$. Within this frame are journaled any desired number of axles B, upon which are rigidly mounted driving-wheels C C', forming gangs D. The axles B are so arranged relative to one another that the wheels of one gang will intermesh or overlap those of the adjacent gang. The outer wheels, C', of the front and rear gangs are each provided with an annular flange, $c'$, the office of the latter being to cut into the soil to assist in guiding the engine, and, further, to guide the endless track E upon the wheels to prevent its displacement.

F represents a block or bracket projecting from the upper edge of the inner side, $f$, of the frame A. Within a bearing, $f'$, of this block is journaled a shaft, G, upon whose inner end is mounted a drive-wheel, H, while upon its opposite end is mounted a spur-pinion, $h$. Below the shaft G, within the block F, is arranged a second shaft, I, carrying a spur-wheel, $i$, meshing with the pinion $h$, and a pinion, $i'$, concentric with the wheel $i$. This pinion $i'$ is adapted to mesh with a large gear-wheel, J, mounted rigidly on the central axle, B, and carrying a concentric pinion, $j$, with which respectively mesh the spur-wheels K and K', mounted on the front and rear axles of the frame. The wheel K' also meshes with the pinion $i'$.

The endless track of my device consists of an inner strip, Z, of heavy rubber belting or other elastic material, to which are secured by rivets $z$ a series of cross-bars, Y. The latter are arranged parallel with one another, but are not connected together. A covering-strip, X, of rubber or equivalent material, is secured over these bars Y, either by the rivets $z$ or in any other suitable manner. The track thus formed has the following advantages: It is kept rigid and prevented from being strained out of shape by the metallic bars Y, and the latter will operate when the track is revolved to "bite" the ground to secure a strong traction-power, and at the same time the tendency to suction or adherence of the flat bars to the ground when leaving the ground is avoided by the elastic covering, which will afford a gradual movement of the bars away from the ground.

By the construction and arrangement of the gangs of driving-wheels hereinbefore described a full and broad bearing for the endless track is secured and the maximum amount of effective contact with the earth obtained.

I do not limit myself to the number of gangs of driving-wheels to be used; but the number may be increased, as desired, to multiply the power of the engine.

The operation of the device will be readily understood. Motion being imparted to the wheel H from a steam-engine carried by the truck, the train of spur-gearing will be operated to revolve the gangs of wheels carrying the endless track.

The two trucks of the engine will be so connected that one may be reversed while the other is driven forward to facilitate turning the machine in the field.

Having fully described my invention, what I claim as new, and desire to secure by Letters Patent, is—

1. In a traction-engine, the combination, with the frame and wheels, of an endless belt or track, consisting of an inner layer of belting, transverse bars secured thereto, and an elastic covering, substantially as set forth.

2. A track for traction-engines, consisting of two or more strips of flexible material having transverse metallic bars interposed between them, substantially as set forth.

3. A track for traction-engines, consisting of the combination, with an inner layer of flexible material, of transverse metallic bars riveted thereto, and an outer layer or covering of elastic material, substantially as set forth.

4. In a traction-engine, the combination, with the frame or truck, of gangs of wheels mounted rigidly on axles within the frame, the outer wheels of the gangs being provided with annular flanges, and an endless track adapted to be guided by said flanges, substantially as set forth.

In testimony whereof I have signed this specification in the presence of two subscribing witnesses.

JACOB NIXON.

Witnesses:
L. D. ZENOR,
J. D. PRYOR.